(12) United States Patent
Hanagan

(10) Patent No.: US 6,422,648 B1
(45) Date of Patent: Jul. 23, 2002

(54) MOTORCYCLE SADDLE WITH BACKREST

(75) Inventor: Michael W. Hanagan, Monterey, CA (US)

(73) Assignee: Corbin Pacific, Inc., Hollister, CA (US)

( * ) Notice: Subject to any disclaimer, the term of this patent is extended or adjusted under 35 U.S.C. 154(b) by 0 days.

(21) Appl. No.: 09/754,549

(22) Filed: Jan. 5, 2001

(51) Int. Cl.[7] .............................. B62J 1/00; B62J 1/28
(52) U.S. Cl. ......................... 297/215.12; 297/215.11; 297/292
(58) Field of Search ................. 297/215.11, 215.12, 297/292

(56) References Cited

U.S. PATENT DOCUMENTS

| | | | |
|---|---|---|---|
| 4,570,998 A | | 2/1986 | Hughes |
| 4,596,422 A | * | 6/1986 | Stahel ..................... 297/378.1 |
| 4,679,647 A | * | 7/1987 | Komuro ..................... 180/219 |
| 4,953,911 A | | 9/1990 | Hanagan |
| 5,026,119 A | | 6/1991 | Frank et al. |
| 5,444,937 A | | 8/1995 | Hanagan |
| 5,608,957 A | | 3/1997 | Hanagan |
| 5,997,088 A | * | 12/1999 | Stark et al. ............ 297/354.13 |
| 6,007,150 A | * | 12/1999 | Clerkin et al. ......... 297/215.12 |
| 6,068,334 A | * | 5/2000 | Bonofilio ............... 297/215.12 |
| 6,224,081 B1 | * | 5/2001 | Wayman et al. ......... 280/288.4 |

* cited by examiner

Primary Examiner—Peter M. Cuomo
Assistant Examiner—Joseph Edell
(74) Attorney, Agent, or Firm—Pepe & Hazard LLP

(57) ABSTRACT

A tandem motorcycle saddle and backrest has a backrest mounting unit embedded in the cushioning material in the front section of said passenger seat portion. The unit has a housing with a slot in the top wall, and a pivotable member pivotably mounted in the housing for movement in a path along the slot. A spring means biases the pivotable member about the pivot in a rearward direction to an upright position as oriented on the motorcycle, and a stop element limits movement in the rearward direction. The fabric covering and cushioning material have openings therein aligned with the housing slot. The backrest has an elongated rigid support arm having its lower portion extending through the opening in the slot, and removably seated in the pivotable member. The backrest is pivotable in a forward direction against the biasing pressure of the spring.

13 Claims, 4 Drawing Sheets

MOTORCYCLE SADDLE WITH BACKREST

BACKGROUND OF THE INVENTION

The present invention is directed to motorcycle seats employing backrests and, more particularly, to tandem seats employing a backrest for the driver.

Tandem motorcycle seats are well known and are widely employed to enable the motorcycle operator to transport a passenger. Although frequently the driver or motorcycle owner desires to have a backrest for comfort during extended periods of operation, such backrest may interfere with the comfort of the passenger or the ease with which the passenger may get on or off the seat. Moreover, in the event of a sudden stop or collision, the passenger may be thrown forwardly against the relatively rigid backrest, and potentially suffer injury as the result.

Moreover, providing a rigidly mounted backrest in seats sometimes provides a substantial increase in cost and complications in the molding operation. Lastly, some motorcycle seats having backrests affixed thereto are less desirable in appearance since the backrest supporting attachment tends to interfere with the appearance or contour of the saddle.

It is an object of the present invention to provide a novel tandem saddle with a driver backrest.

It is also an object to provide such a tandem motorcycle seat and backrest which is attractive and relatively long lived.

Another object is to provide such a tandem motorcycle saddle and backrest which can be readily manufactured and which provides a relative rigid support for the backrest.

A further object is to provide such a tandem saddle with a backrest which will pivot forwardly to enable the passenger to easily mount the passenger portion and which will also pivot forwardly in the event of an impact to minimize the potential for injury if the passenger is thrown forwardly against the backrest.

Yet another object is to provide a novel and simple method for providing an improved tandem motorcycle saddle and backrest assembly.

SUMMARY OF THE INVENTION

It has now been found that the foregoing and related objects may be readily attained in a tandem motorcycle saddle and backrest assembly in which a tandem saddle has a driver seat portion and a passenger seat portion comprised of a platform member for mounting the saddle on the frame of a motorcycle, an exterior fabric covering, and a synthetic resin cushioning material therebetween.

A backrest mounting unit is embedded in the cushioning material in the front section of the passenger seat portion and includes a housing having a base and a top wall with a slot therein, a pivotable member in the housing having a passage therein aligned with the housing slot, and pivot means pivotably mounting the pivotable member on the housing adjacent the top wall for pivotal movement in a path along the slot. Spring means biases the pivotable member about the pivot means in a rearward direction to an upright position as oriented on the motorcycle, and a stop element in the housing limits movement in the rearward direction. The fabric covering and cushioning material have openings therein aligned with the housing slot and the housing is secured to the platform member.

Removably seated in the mounting unit is a backrest subassembly including an elongated rigid support arm having its lower portion extending through the opening in the fabric covering and through the slot, and removably seated in the passage of the pivotable member. A backrest is mounted on the upper portion of the support arm, and the backrest subassembly is pivotable in a forward direction against the biasing pressure of the spring means.

Preferably, the assembly includes retention means releasably retaining the support arm in the pivotable member, and the platform member has an opening therethrough over which the housing is dispose. The housing base has an opening therein cooperating with the opening in the platform member to provide access to the pivotable member.

Desirably, the retention means is a threaded fastener threadably seated in the pivotable member and engaged with the lower portion of the support arm.

In the preferred embodiments, the base of the housing includes an outwardly extending flange seated against and secured to the platform member, and the pivot means comprises a pivot shaft extending transversely of the housing and the support arm which is secured thereto. The end portions of the pivot shaft are journalled in the housing, and the spring means comprises a compression spring coiled about the pivot shaft.

The method of making the tandem motorcycle saddle with a backrest includes the steps of providing a mold with the desired contours for the saddle, and forming a backrest pod with a housing with a base and a top wall with a slot therein, a pivotable member in the housing, pivot means pivotably mounting the pivotable member on the housing, and spring means biasing the pivotable member. The pivotable member has a passage therein aligned with the slot. A platform member is provided in the mold and the base of the backrest pod is secured against the platform member.

A foamable synthetic resin is introduced into the mold to expand and provide foam cushioning material substantially filling the mold and encasing the pod therein except for the area above the slot. The foam cushioning material is cured to bond it to the platform member, the cured assembly of platform member, and pod and cushioning material is removed from the mold. The foam cushioning material is covered with a fabric covering having an opening therein aligned with the slot, and the lower portion of a support arm having a backrest on its upper portion is inserted into the passage of the pivotable member.

Preferably, the platform member is formed in situ by placing a curable synthetic resin and reinforcing material against the surface of the mold. The base of the backrest pod is secured to the platform member by placing a curable synthetic resin and reinforcing material about the base of the pod to bond to the platform member. To improve the engagement of the pod to the platform member, the pod forming step includes providing an outwardly extending flange about the base over which the resin and reinforcing material extends.

However, the pod can also be bolted or riveted to the saddle member which can be preformed in a separate step. Moreover, the pod can be adhesively engaged directly to the surface of the saddle member.

Conveniently, the curing of the resin and reinforcing material and the curing of the form cushioning material occur contemporaneously.

DETAILED DESCRIPTION OF THE ILLUSTRATED EMBODIMENT

Figure 1:
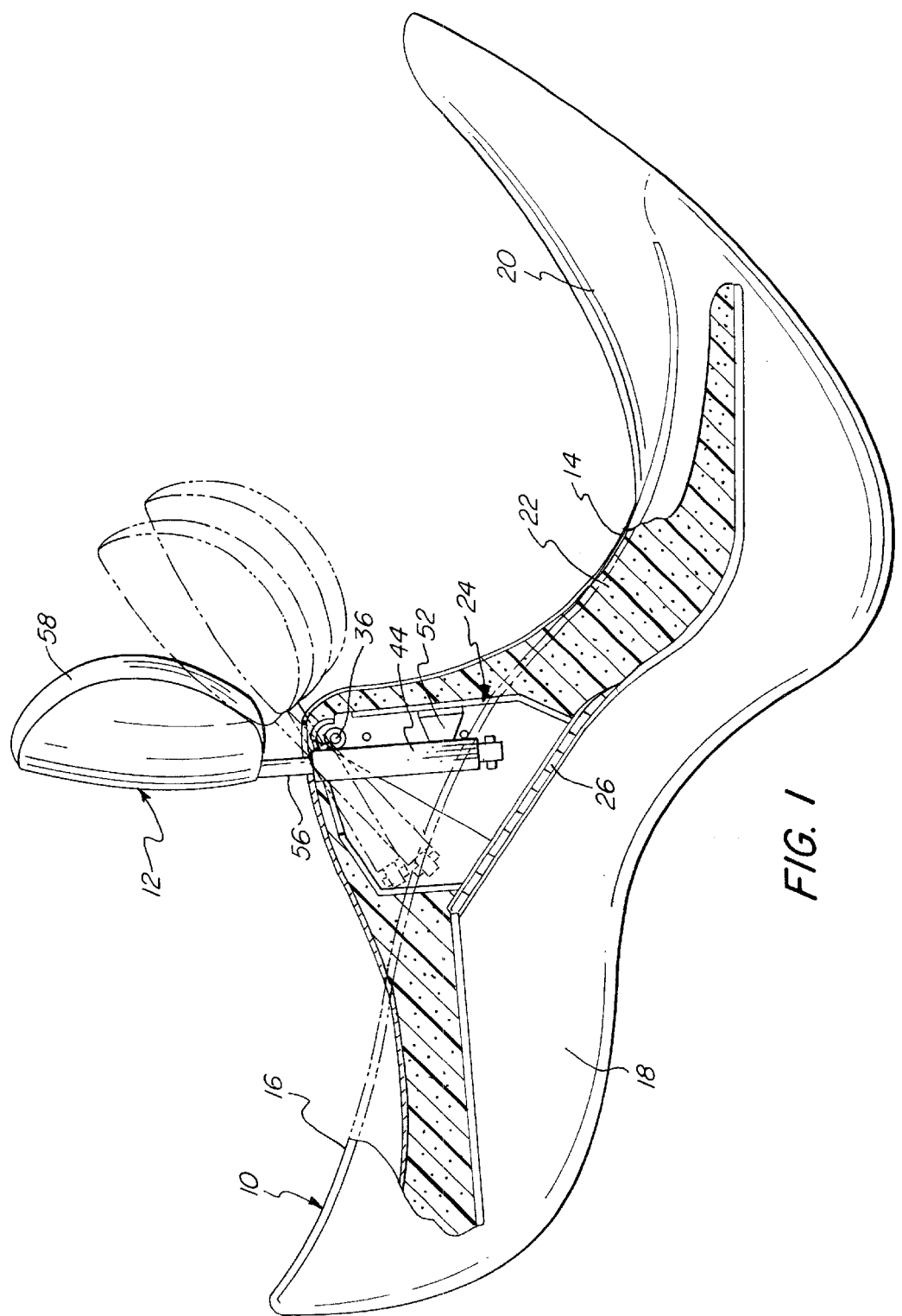
FIG. 1 is a side elevational view of a motorcycle saddle embodying the present invention with portions thereof broken away to reveal internal construction, with the saddle oriented in the attitude it would have on the motorcycle frame, and with the backrest shown in full line in the normal fully erect position and in phantom line in various pivoted positions.
Figure 2:
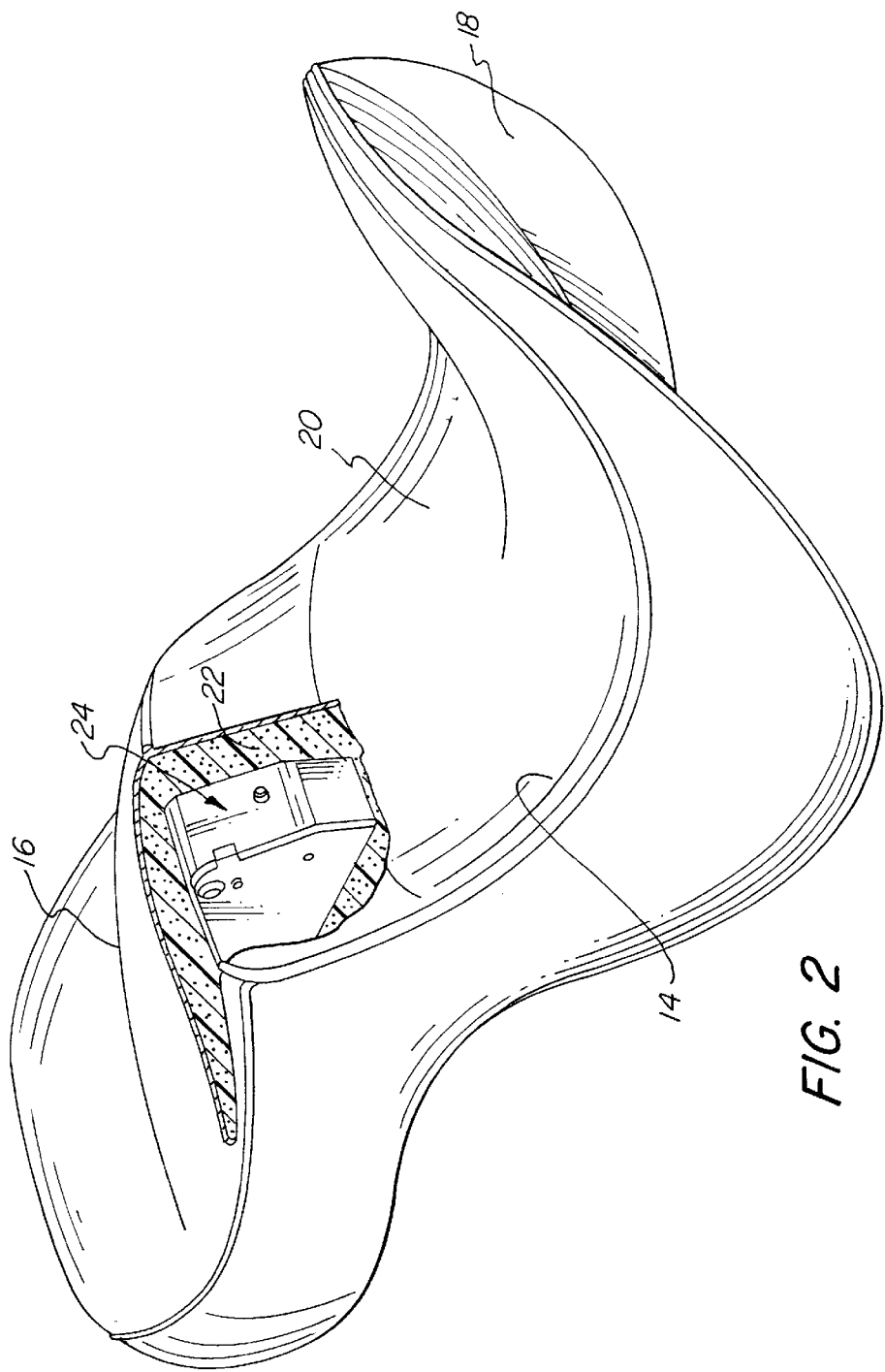
FIG. 2 is a front perspective view of the saddle and in partial section with the backrest removed, showing the manner in which the pod is disposed within the saddle.

Turning first to FIGS. 1 and 2, a tandem motorcycle saddle embodying the present invention is therein illustrated and is comprised of the saddle member generally designated by the numeral 10 and the backrest assembly generally designated by the numeral 12. The saddle 10 has a driver seat portion 14 at its forward end and a passenger seat portion 16 at its rearward end.

The saddle member 10 is comprised of a molded synthetic resin platform member 18, a fabric covering 20, and cushioning material 22. As shown, embedded within the cushioning material 22 at the forward end of the passenger seat portion 16 is the backrest pod generally designated by the numeral 24. The backrest generally designated by the numeral 46 is supported in the pod 24 for pivotal movement from its normal vertically oriented position shown in full line in FIG. 1 forwardly to pivoted positions illustrated in phantom line.

Figure 3:
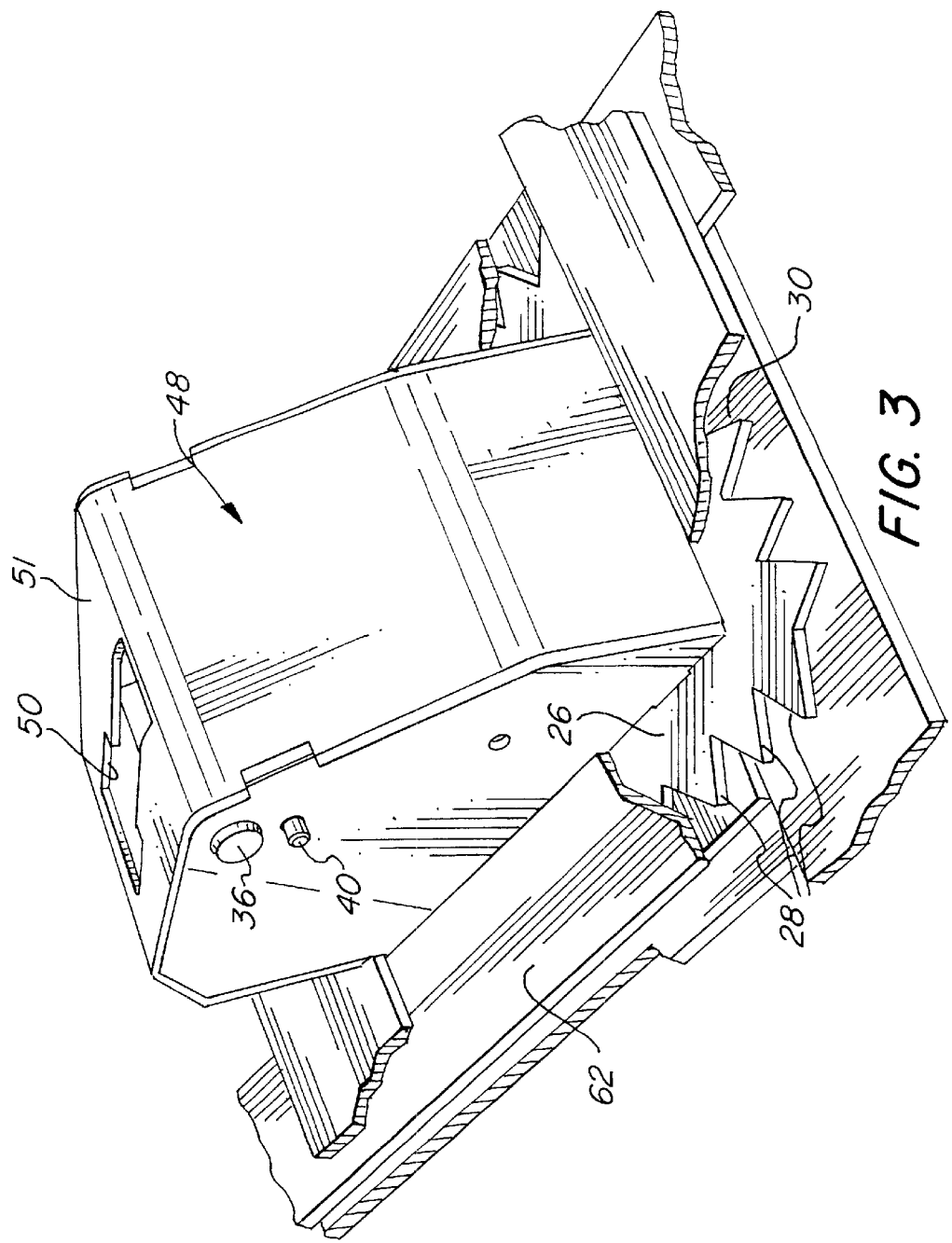
FIG. 3 is a perspective view of the backrest pod shown with fragmentarily illustrated fiberglass reinforcing as it would be disposed in the mold.
Figure 4:
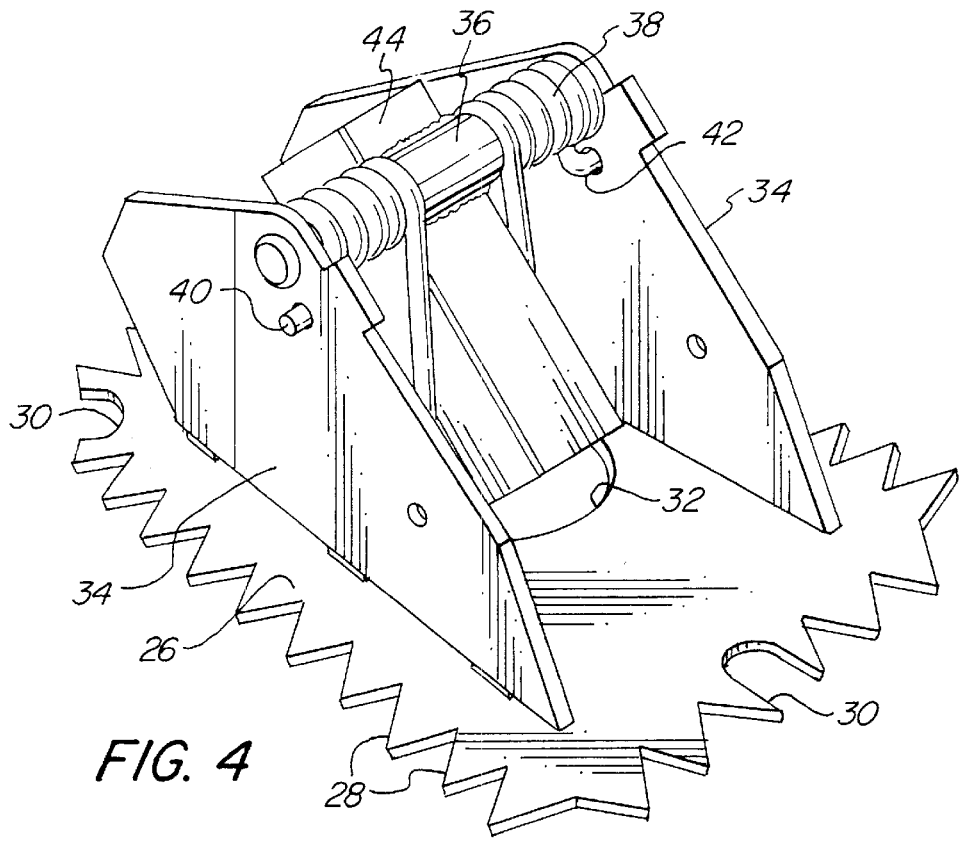
FIG. 4 is a perspective view of the backrest pod utilized in the saddle of FIG. 1 drawn to an enlarged scale and with the cover removed.
Figure 5:
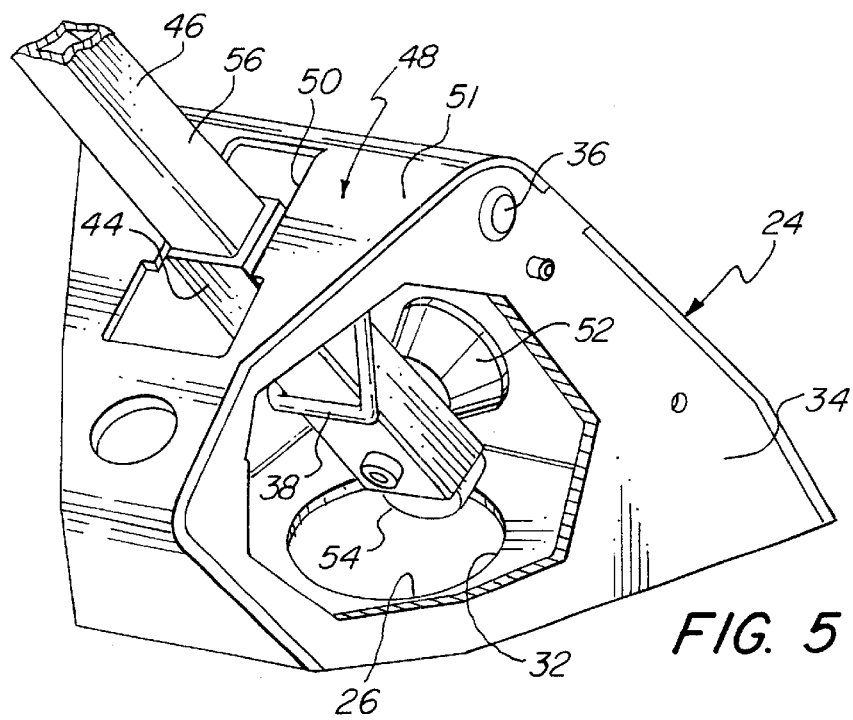
FIG. 5 is a perspective view of the pod with the fragmentarily illustrated backrest arm seated therein and with a portion of the housing broken away to reveal internal construction.

Turning now in detail to the backrest pod 24 as seen in FIGS. 3–5, it includes a base plate 26 with multiple indentations 28 about its periphery and a set of three index guides 30 to facilitate positioning in a mold (not shown) having projections which register therewith. As also seen, the base plate 26 has a relatively large circular opening 32 which allows access to the interior of the pod 24 as will be described more fully hereinafter. Extending upwardly from the base plate 26 are spaced parallel vertical plates 34 in which are journalled the ends of the pivot shaft 36 which has wound thereabout a torsion spring 38 having its ends 40 seated in aperture 42 in the vertical plates 34.

As also shown, welded to the pivot shaft 36 is a pivotable receptacle member 44 of generally tubular configuration and closed at its lower end to provide a rectangular recess or channel in which is seated the backrest generally designated by the numeral 46.

As seen in FIG. 3, the pod 24 has a cover generally designated by the numeral 48 which extends between the vertical plates 34 to provide a housing enclosing the operating mechanism therewithin, and an elongated slot 50 is provided in its top wall 51 over the pivotable receptacle member 44.

On the front wall of the cover 48, is a rubber bumper 52 which limits the pivotal movement under the biasing action of the spring 38 to the desired vertical position as shown in FIG. 1. Threadably seated in the base of the pivotable receptacle member 44 is a locking screw 54.

Turning next to the backrest 46, it includes an elongated arm 56 of generally rectangular cross section which snugly seats within the channel of the pivotable receptacle member 44, and which can be locked therein by the locking screw 54. At the upper end of the arm 56 is the backrest cushion 58.

As best seen in FIG. 1, the location of the pivot shaft for the pivotable receptacle member 44 is adjacent the top wall 51 so that the pivotal motion of the backrest cushion 58 on the arm 56 in the slot 50 is substantial, but only a small opening is required in the fabric covering 20 and cushioning material 22 to permit such motion.

In forming the saddle, a mold (not shown) having the desired contours is provided, and, although the platform member 18 may be previously formed and simply inserted into the mold, conveniently the entire assembly is produced in situ in the mold. As seen in FIG. 3, this is accomplished by providing fiberglass reinforcing 62 and resin over the surface of the mold with the exception of a small space which registers with the opening 32 in the base plate 26 of the pod 24. The mold also has locating pins (not shown) which extend upwardly into the index guides 30 to effect the desired location of the pod 24 within the mold. Additional fiberglass and resin is placed over the peripheral flange 64 of the base plate 26 to secure the pod 24 to the platform member 18 as it is formed.

A foamable synthetic resin is then introduced into the mold which is thereafter closed and subjected to the desired heat cycle to expand the synthetic resin to produce the foam which bonds to the fiberglass platform member 18 as a part of the curing process.

The structure can then be removed from the mold and the fabric covering 20 secured thereover in accordance with conventional practice. As molded, the molded cover (not shown) provides a small opening in the cushioning material 22 over the slot 50 in the cover 48, and the fabric covering 20 likewise has a small slot or slit therein for passage of the arm 56 of the backrest 46 therethrough. After the saddle 10 has been finished, the backrest assembly 12 may be inserted thereinto and locked in the position by the locking screw 54 by inserting a tool through the opening 32, or the saddle may be shipped with the backrest assembly 12 unassembled.

As will be readily appreciated, the location of the pivot shaft for the pivotable receptacle member adjacent the top wall of the pod allows a substantial amount of forward movement of the upper portion of the backrest against the biasing pressure of the spring within in a relatively short slot, and, accordingly, requires only a short break in the fabric covering for the seat. Thus, the entire support assembly for the backrest is concealed within the upholstery and, in the event that no backrest is desired or the backrest is removed, the clean, flowing contours of the tandem seat are unbroken by any hardware. However, a backrest can be readily assembled onto the seat by inserting the arm of the backrest into the passage of the pivotable receptacle member and securing it in position by the set screw at its base.

With the pod assembly of the present invention, the tandem seat may be readily molded and the hardware secured in position within the upholstery as a part of the molding operation. This ensures a firm assembly and yet one which does not adversely affect the comfort of the seat itself.

Since the backrest can be pivoted forwardly, a passenger can readily board the seat. In the event of an impact, the backrest will pivot forwardly and there is less likelihood of injury to the passenger who may be thrown forwardly against the backrest.

Thus, it can be seen from the foregoing detailed specification and drawings that the novel tandem motorcycle seat assembly of the present invention is one in which the backrest is firmly supported by concealed hardware so that, when it is desired to remove it, the clean contour and flowing lines of the motorcycle saddle are not obstructed and there is no visible hardware. The process of manufacture is greatly simplified and the resultant assembly is a relatively rigid and long lived.

Having thus described the invention, what is claimed is:

1. A tandem motorcycle saddle and backrest assembly comprising:
   (a) a tandem saddle with a driver seat portion and a passenger seat portion, said saddle having (i) a platform member for mounting the saddle on the frame of a motorcycle; (ii) an exterior fabric covering; and (iii) a synthetic resin cushioning material therebetween;
   (b) a backrest mounting unit embedded in the cushioning material in the front section of said passenger seat portion and including (i) a housing having a base and a top wall with a slot therein; (ii) a pivotable member in said housing having a passage therein aligned with said housing slot; (iii) pivot means pivotably mounting said pivotable member on said housing adjacent said top wall for pivotal movement in a path along said slot; (iv) spring means biasing said pivotable member about said pivot means in a rearward direction to an upright position as oriented on the motorcycle, said pivotable member being pivotable forwardly against the biasing pressure of said spring means; and (v) a stop element in said housing limiting movement in said rearward direction, said fabric covering and cushioning material having an opening therein aligned with said housing slot, said housing being secured to said platform member; and
   (c) a backrest subassembly including (i) an elongated rigid support arm having its lower portion extending through said opening in said fabric covering and through said slot, said support arm being removably seated in said passage of said pivotable member; and (ii) a backrest on the upper portion of said support arm, said backrest subassembly being pivotable in a forward direction against the biasing pressure of said spring means.

2. The tandem motorcycle saddle and backrest assembly in accordance with claim 1 wherein there is included retention means releasably retaining said support arm in said pivotable member.

3. The tandem motorcycle saddle and backrest assembly in accordance with claim 2 wherein said platform member has an opening therethrough over which said housing is disposed, said housing base having an opening therein cooperating with said opening in said platform member to provide access to said pivotable member.

4. The tandem motorcycle saddle and backrest assembly in accordance with claim 3 wherein said retention means is a threaded fastener threadably seated in said pivotable member and engaged with said lower portion of said support arm.

5. The tandem motorcycle saddle and backrest assembly in accordance with claim 1 wherein said base of said housing includes an outwardly extending flange seated against and secured to said platform member.

6. The tandem motorcycle saddle and backrest assembly in accordance with claim 1 wherein said pivot means comprises a pivot shaft extending transversely of said housing and said support arm which is secured thereto, the end portions of said pivot shaft being journalled in said housing.

7. The tandem motorcycle saddle and backrest assembly in accordance with Claim 6 wherein said spring means comprises a compression spring coiled about said pivot shaft.

8. In the method of making a tandem motorcycle saddle with a backrest, the steps comprising:
   (a) providing a mold with the desired contours for the saddle;
   (b) forming a backrest pod comprising (i) a housing with a base and a top wall with a slot therein, (ii) a pivotable member in said housing, (iii) pivot means pivotably mounting said pivotable member on said housing, and (iv) spring means biasing said pivotable member, said pivotable member having a passage therein aligned with said slot,
   (c) providing in said mold a platform member;
   (d) securing said base of said backrest pod against said platform member;
   (e) introducing a foamable synthetic resin into said mold to expand and provide foam cushioning material substantially filling said mold and encasing said pod therein except for the area above said slot;
   (f) curing said foam cushioning material to bond it to said platform member;
   (g) removing from said mold the cured assembly of platform member, pod and cushioning material;
   (h) covering said foam cushioning material with a fabric covering having an opening therein aligned with said slot; and
   (i) inserting into said passage of said pivotable member the lower portion of a support arm having a backrest on its upper portion, said pivotable member and thereby said support arm and backrest being biased by said spring means rearwardly toward the rear of said saddle, said pivotable member and thereby said support arm being freely pivotable forwardly against the biasing pressure of said spring towards the front of said saddle.

9. The method of making a tandem motorcycle saddle with a backrest in accordance with claim 8 wherein step of providing said platform member comprises placing a curable synthetic resin and reinforcing material against the surface of said mold.

10. The method of making a tandem motorcycle saddle with a backrest in accordance with claim 9 wherein the step of securing said base of said backrest pod comprises placing a curable synthetic resin and reinforcing material about said base of said pod to bond to the platform member.

11. The method of making a tandem motorcycle saddle with a backrest in accordance with claim 10 wherein said pod forming step includes providing an outwardly extending flange about said base over which said resin and reinforcing material extends.

12. The method of making a tandem motorcycle saddle with a backrest in accordance with claim 9 wherein the curing of said resin and reinforcing material and the curing of said form cushioning material are contemporaneous.

13. The method of making a tandem motorcycle saddle with a backrest in accordance with claim 8 including the further step of releasably engaging said lower portion of said support arm in said pivotable member.

* * * * *